United States Patent [19]
Gatlin et al.

[11] Patent Number: 5,754,688
[45] Date of Patent: May 19, 1998

[54] METHOD AND APPARATUS FOR STEREOLOGIC ANALYSIS OF TWO-DIMENSIONAL IMAGES

[75] Inventors: Cindy L. Gatlin; William H. Jordan, both of Greenfield; Brian L. Kuyatt, New Palestine; Eric S. Schaberg, Greenwood, all of Ind.

[73] Assignee: Eli Lilly and Company, Indianapolis, Ind.

[21] Appl. No.: 792,440

[22] Filed: Jan. 30, 1997

Related U.S. Application Data

[63] Continuation of Ser. No. 371,084, Jan. 10, 1995, abandoned, which is a continuation of Ser. No. 71,774, Jun. 4, 1993, abandoned.

[51] Int. Cl.$^6$ .............................. G06K 9/46; G06K 9/66
[52] U.S. Cl. .............................. 382/193; 382/194
[58] Field of Search .............................. 382/192–193, 382/194, 199, 201, 133; 364/525, 564, 555

[56] References Cited

U.S. PATENT DOCUMENTS

| 4,054,782 | 10/1977 | Weibel | 364/555 |
| 4,334,274 | 6/1982 | Agui et al. | 382/22 |
| 4,453,266 | 6/1984 | Bacus | 382/6 |
| 5,121,436 | 6/1992 | Kasdan et al. | 382/6 |
| 5,159,361 | 10/1992 | Cambier et al. | 351/212 |
| 5,231,580 | 7/1993 | Cheung et al. | 364/413.13 |
| 5,307,292 | 4/1994 | Brown et al. | 364/564 |

FOREIGN PATENT DOCUMENTS

| 4024640 | 4/1993 | WIPO | 382/128 |

OTHER PUBLICATIONS

Levine, Martin D. *Vision in Man and Machine*, McGraw-Hill, 1985, pp. 290–293.

N. D. Pentcheff et al., "Computer Assisted Data Collection for Stereology: Rationale and Description of Point Counting Stereology (PCS) Software," *Microscopy Research and Technique*, 21:347–354 (1992).

(List continued on next page.)

*Primary Examiner*—Joseph Mancuso
*Assistant Examiner*—Jayanti K. Patel
*Attorney, Agent, or Firm*—Woodard, Emhardt, Naughton Moriarty & McNett

[57] ABSTRACT

A method and apparatus for analyzing two-dimensional structures to obtain three-dimensional quantitative information therefrom includes a video camera, a digitizing board for transforming video image output signals from the video camera into digital data, and a computer for analyzing the digitized video image data. Regions of interest or desired objects in the video image corresponding to the video image data are observed by an operator. Thresholding commands are supplied to the computer instructing the computer to manipulate the digitized video image data to enhance or distinguish the regions of interest from other areas in the video image. Once sufficient thresholding is accomplished, the computer executes an algorithm that identifies the regions of interest, draws a solid line around them, and sets all of the video image data defining each region of interest bounded by a solid line to a predetermined threshold value. Subsequently, a grid size is specified by the operator and an analysis grid is overlaid on the video image data. The video image data is analyzed at locations corresponding to the grid intersection locations. If a region of interest is found to exist at a grid intersection location, a point count value is incremented. Further, the computer counts the total regions of interest in the video image data. The video image data can be thresholded at other grayscale levels to identify other regions of interest in the video image data. Thus, other regions of interest can be quantified. Stereologic values such as $N_A$ (number per area), $N_V$ (number per volume), and $V_V$ (volume per volume) can be derived from the results of the video image data analysis performed according to the present invention.

16 Claims, 10 Drawing Sheets

OTHER PUBLICATIONS

M.C. Poole, "An Image Processing/Stereological Analysis System for Transmission Electron Microscopy," *Microscopy Research and Technique*, 21:283–291 (1992).

D.M. Hyde, et al., "Computer–Assisted Morphometry: Point Intersection, and Profile Counting and Three–Dimensional Reconstruction," *Microscopy Research and Technique*, 21:262–270 (1992).

R.P. Bolender, "Biological Stereology: History, Present State, Future Directions," *Microscopy Research and Technique*, 21:255–261 (1992).

D.M. Hyde, et al., "Mophometric Assessment of Pulmonary Toxicity in the Rodent Lung," *Toxicologic Pathology*, vol. 19, No. 4 (Part I), pp. 428–446 (1991).

E. Weibel, *Stereological Methods, vol. 1, Practical Methods for Biological Morphometry*, Academic Press, Inc. (1979).

METHOD AND APPARATUS FOR STEREOLOGIC ANALYSIS OF TWO-DIMENSIONAL IMAGES

This application is a continuation of application Ser. No. 08/371,084, filed Jan. 10, 1995, now abandoned, which is a continuation of application Ser. No. 08/071,774, filed Jun. 4, 1993, now abandoned.

FIELD OF THE INVENTION

This invention relates to computer analysis of digitized images and more specifically to computer analysis of two-dimensional images to derive three-dimensional quantitative information therefrom.

BACKGROUND OF THE INVENTION

Stereology is defined as the study of three-dimensional structures through observation of two-dimensional images, usually of sections through the structure. It follows therefrom, that morphometry is the measurement of such structures. The discipline of stereology was developed to generate quantitative values for particular regions of interest in photographs. In stereology, methods of point counting and planimetry are used to determine three-dimensional quantitative parameters (i.e., volumes) using measurements obtained from a two-dimensional image.

Manual or hand implementation of the stereology technique referred to as point counting is accomplished by the following sequence of steps. First, a cross-sectional image of the three-dimensional object is obtained. Next, the relative size of the regions of interest or objects of interest in the two-dimensional image are observed to determine an appropriate grid size. The grid size is selected so that two grid intersection locations only rarely overlay the same region of interest or object of interest. The grid is then drawn on or overlaid on the two-dimensional image. The point counting step is carried out for each intersection location of the grid, and the worker manually counts or totals the number of locations wherein the grid intersection lines fall on one of the desired objects. Quite often, the desired objects or regions of interest in the two-dimensional image are visually enhanced using dye staining techniques.

Planimetry is a computerized morphometric technique whereby a photomicrograph or projected image is placed directly onto a computer digitizer tablet and regions of interest are selected manually by the user circumscribing a region of interest with an electronic mouse or stylus on the computer digitizer tablet. Planimetry area results are subsequently recorded on the computer for analysis. Both planimetry and point counting techniques are labor intensive, not easily reproduced and subjectively determined. Automation of the point counting procedure would introduce a more objective sampling technique.

Presently, a public domain computer program known as NIH (National Institute of Health) Image v10.44, written by Wayne Rasband, an employee of NIH in Bethesda, Md., provides a semi-automated tool useful in analyzing two-dimensional images. The Image software provides a "thresholding" function wherein regions of interest or desired objects in a photograph or video image are further enhanced in accordance with grayscale or shading changes on a video monitor. The data corresponding to the video image may be automatically analyzed to derive quantitative information therefrom. In practical application, preparation of the cross-section of the two-dimensional surface using dyes creates a visual enhancement of the regions of interest. The Image software is designed to provide an enhanced or thresholded image of the original two-dimensional image so that the enhanced regions of interest are more pronounced on a corresponding video image. Software is presently in development by a company known as Morphometrix of Davis, Calif., that will superimpose stereologic grids onto the video image to enable manual point counting of the regions of interest located beneath the grid intersection locations.

*Practical Stereology*, by John C. Russ, Plenum Press, New York, 1986, is a good reference for and provides a thorough review of the principles of stereology and various techniques for applying the principles. Included in the text are numerous formulae, some of which are set forth below and form a part of the description of the preferred embodiment.

Automation of the point counting technique would significantly reduce the labor required and time invested, thereby improving efficiency, objectivity and reproducibility in quantitating two-dimensional structures to obtain three-dimensional information.

SUMMARY OF THE INVENTION

An apparatus for analyzing a digitized video image to produce three-dimensional quantitative values, according to one aspect of the present invention, is comprised of the following. Digital data defining a two-dimensional image is provided. The two-dimensional image includes desired objects having an area within a predetermined area range and areas not of interest. An operator input means produces operator command signals in response to manual operator inputs, including a stereologic grid size signal and a thresholding signal. The apparatus also includes a video monitor having a monitor input, the video monitor providing a video image in response to signals supplied to the monitor input. A processor means including read/write memory analyzes the video image signal to produce the three-dimensional quantitative values. The processor means responds to the operator command signals to perform the following steps: (1) receiving the stereologic grid size signal, (2) receiving the thresholding signal, (3) altering the digital data corresponding to and defining the desired objects in accordance with the thresholding signal to increase outline definition of the objects defined by the digital data, (4) supplying a thresholded video signal to the monitor input, the thresholded video signal synthesized from the digital data, (5) repeating steps (3) and (4) if further thresholding signals are received by the processor means, (6) altering the digital data so that a continuous solid line is drawn around each of the desired objects in the video image and altering the digital data so that the entire area within the solid line is identical in value and equal to a predetermined threshold value, (7) determining grid intersections locations within the digital data in accordance with the grid size signal, (8) analyzing the digital data corresponding to each grid intersection location for a density value within the predetermined threshold range and, if so, then searching the digital data defining the area surrounding each of the grid intersection locations to ascertain whether the digital data defines a solid line thereabout, and (9) incrementing a point count value each time a solid line is detected as surrounding the grid intersection locations of step (8).

A method of operating a computer to analyze two-dimensional images and derive three dimensional quantitative information therefrom, according to another aspect of the present invention, comprises the steps of providing digital data defining an image containing various objects including desired objects having an area that falls within a predetermined area range and undesired objects having an area outside the predetermined area range. Next a stereologic grid size is specified based upon the predetermined area range. The digital data is processed in a thresholding step so that the desired objects viewable in the video image become well-defined desired objects and the undesired object become well-defined undesired objects when the video image is viewed by an operator. Then an outlining step is performed on the well-defined desired objects described by the digital data. The outlining step includes analyzing the digital data and altering the digital data so that a solid line of pixels is drawn around the more pronounced desired objects in the video image to create a video image including outlined desired objects. Next the step of altering all of the digital data defining pixel video information within the outlined desired object to a predetermined threshold value is performed. The processor means automatically performs the following steps for each intersection location of the stereologic grid: (1) determining if the digital data corresponding to the intersection location is equal to the predetermined threshold value, (2) searching the digital data defining the area surrounding the intersection location to ensure that the intersection location is enclosed by a solid outline, and (3) incrementing a point count value if the grid location is located within a solid outline.

One object of the present invention is to provide a more efficient and reliable semi-automated method and apparatus for deriving quantitative values for a three-dimensional body from analysis of a two-dimensional cross-section of the three-dimensional body.

Another object of the present invention is to reduce the amount of time required to generate quantitative values in accordance with the method and apparatus disclosed.

Yet another object of the present invention is to establish stereologic image analysis methods and devices that provide a high degree of objectivity in evaluating a two-dimensional image.

Still another object of the present invention is to provide a method and apparatus for producing quantitative information as to volume per unit volume, area of an object per area evaluated, number of objects of interest per area evaluated and number of objects per volume evaluated.

A further object of the present invention is the determination of true objects of interest by searching in all directions for a dark border after locating a thresholded point. The dark border is drawn around thresholded objects meeting select criteria automatically during a "particle analysis" step of the process. This feature enhances precision of point counting by this semi-automated method.

These and other objects of the present invention will become more apparent from the following figures and the description of the preferred embodiment.

DESCRIPTION OF THE PREFERRED EMBODIMENT

Figure 1:
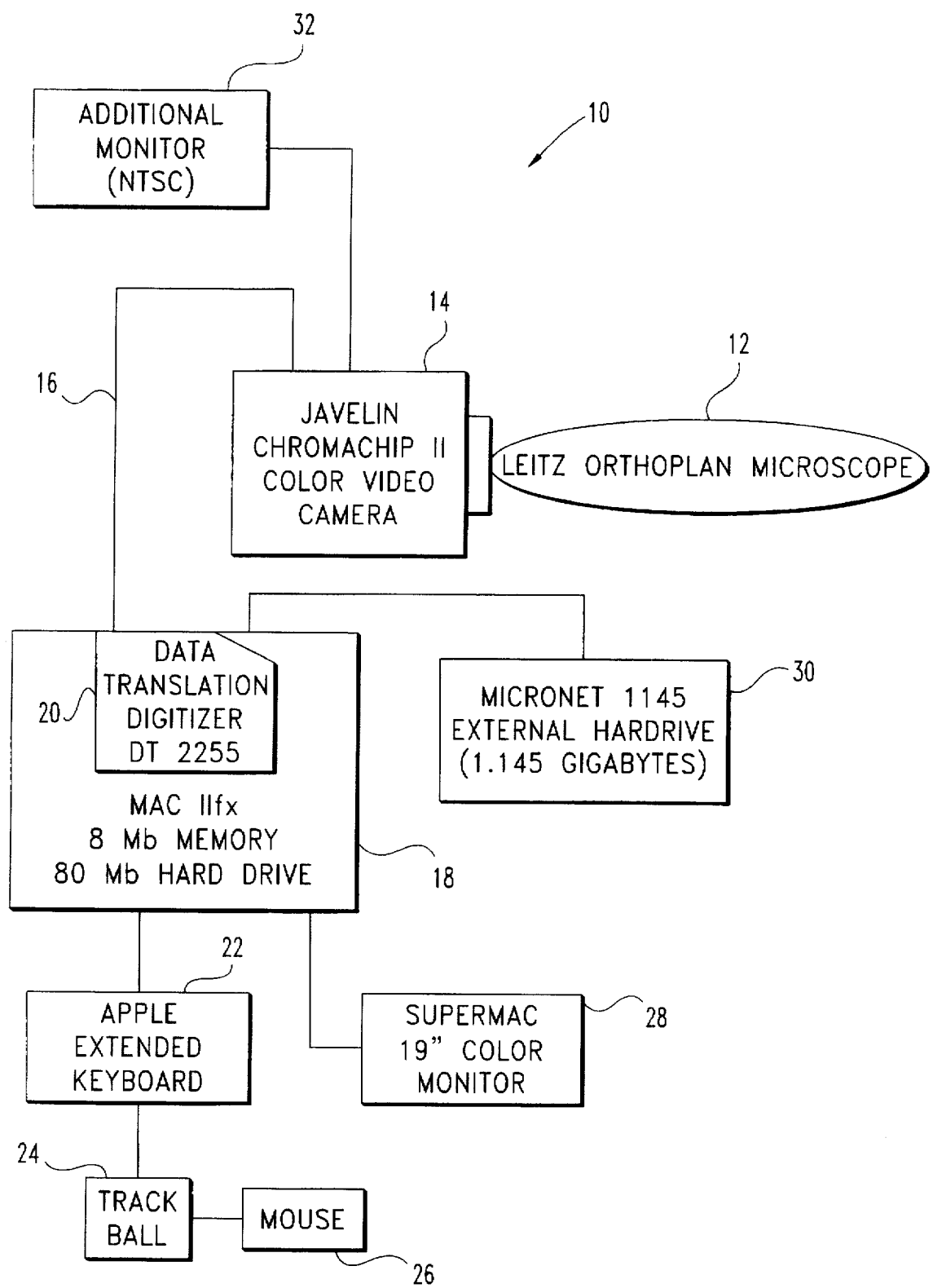
FIG. 1 is a block diagram of an apparatus for stereologic analysis of two-dimensional images according to one aspect of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a block diagram of an apparatus for stereologic analysis of two-dimensional images 10 according to the present invention is shown. Apparatus 10 includes the following components. A microscope 12 provides a means for magnifying a cross-sectional image (e.g., a tissue sample) to produce a magnified image thereof. A color video camera 14 provides a video image signal over signal path 16 to a computer or processor means 18. Computer 18 includes a video image digitizer circuit board 20. The digitizer board 20 includes a high speed analog to digital converter that digitizes the video image signal from color video camera 14 into digital data corresponding to the image. Keyboard 22, track ball 24 and mouse 26 provide a means by which an operator can manually enter commands or data in response to prompts by computer 18 for such information. Additionally, commands and any other type of manual input can be inputted via the keyboard 22, track ball 24 or mouse 26. A color video monitor 28 receives a video signal from computer 18 and provides a viewable video image in accordance with digital data in the memory of computer 18. An external disk drive 30 provides a mass storage medium for storing large quantities of data generated by computer 18. Additionally, disc drive 30 may serve as the mass storage device for storing executable software or other temporary data files used in conjunction with computer 18 and well known to those skilled in the art. An additional video monitor 32 is shown connected to a video output connection of the video camera 14 that may provide instantaneous feedback of the video image of the object or tissue sample situated within the view of microscope 12.

In the preferred embodiment, computer 18 is a Macintosh MAC IIfx computer with an eight megabyte random access memory and an eighty megabyte disk drive capacity. Additionally, the computer 18 includes certain data and programs stored in ROM and the capability of performing analog and digital input/output operations. For purposes of the present application, the video digitizer board 20 is a Data Translation digitizer board Model No. DT 2255. The video monitors 28 and 32 are well known in the art and need no further description. The disk drive 30, mouse 26, track ball 24 and keyboard 22 are also well known devices. The color video camera 14 is a Javelin Chromochip II model color video camera. The disk drive 30 is a Micronet 1145 external hard drive with a 1.145 gigabyte capability.

Operationally speaking, a cross-section of a tissue sample (not shown) is placed under microscope 12 and an optical coupling system enables color video camera 14 to provide a color video image signal to the digitizer board 20 of the tissue sample. Digitizer board 20 digitizes the color video image signal from the video camera 14 and makes the digital data corresponding thereto available to the computer 18 for use in providing a color video signal to the monitor 28 as well as making the data available for alteration or analysis purposes in RAM memory of computer 18. The hard disk drive of computer 18 and disk drive 30 provide permanent memory storage capability for the digitized video images if such need be stored.

Figure 2:
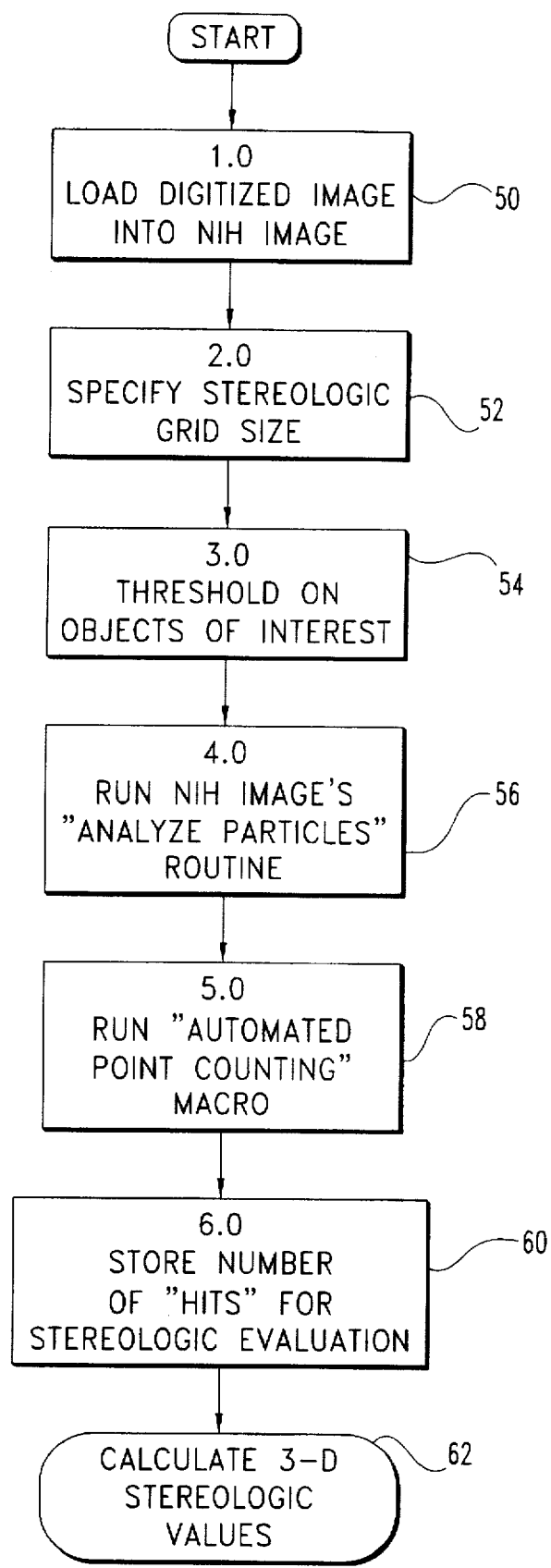
FIG. 2 is a flowchart of the software executed by the apparatus of FIG. 1 to yield quantitative stereologic values.
Figure 5:
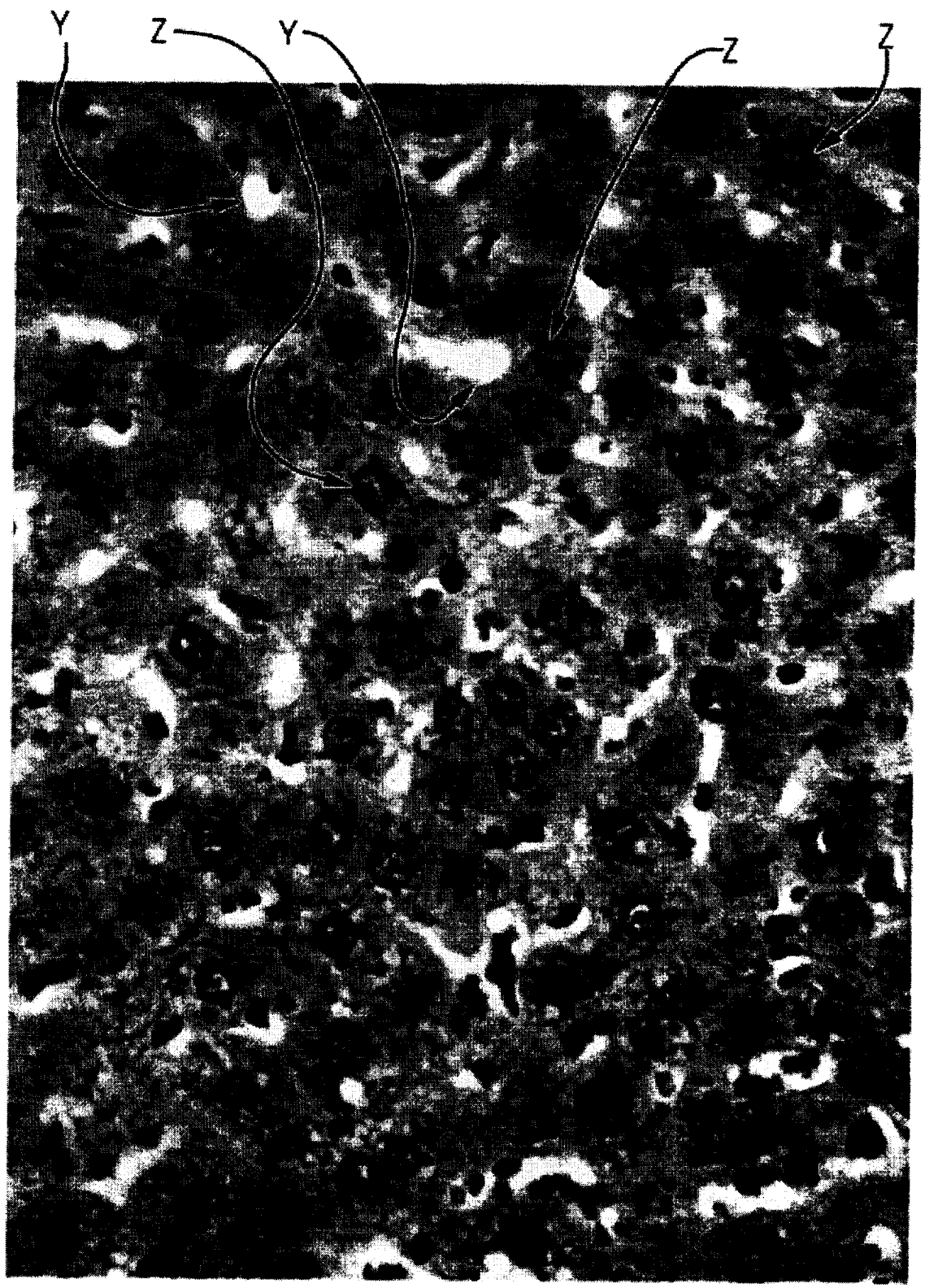
FIG. 5 is a printout of a digitized video image depicting a liver tissue sample including desired objects or regions of interest and undesired objects.

Referring now to FIG. 2, a flow chart for the automated point counting software routine according to the present invention is shown. The software routine shown in FIG. 2 presupposes that the operator has located a tissue sample within view of the color video camera 14 wherein stereology techniques are to be applied in ascertaining quantitative values. Further, the flowchart presumes the operator has activated the digitizer board 20 to digitize the video signal from the video camera 14 and place the corresponding digital data into a memory location accessible by computer 18. At step 50 digital data from digitizer board 20 is passed to the NIH Image program. Subsequently, at step 52, the operator visually observes the size of the regions of interest or desired objects in the video image appearing on the monitor 28 and specifies a grid size (typically in centimeters) in accordance therewith. For example, one such video image is shown in FIG. 5. FIG. 5 is a black and white (grayscale) depiction of the video image shown on the color monitor 28. The regions of interest for desired objects in this particular tissue sample are the liver cell nuclei some of which are identified by the letter "Z" in FIG. 5. It should be noted that the liver cell nuclei "Z" have a fairly unique shape and size in comparison with the other artifacts (y) appearing in FIG. 5.

Figure 6:
FIG. 6 is a printout of a digitized video image derived from FIG. 5 after the thresholding step has been executed.

Thereafter at step 54, the operator activates the "Density Slice" tool in the software toolbox of the Image software and is prompted to specify the low and the high grayscale number of the threshold range desired. Subsequently, in response to "increased" or "decreased" thresholding commands from the operator, the computer alters the digital data and the image of FIG. 5 to produce the desired image shown in FIG. 6. Note that FIG. 6 is a two color, binary image and the dark spots and dark areas are the "thresholded" regions of interest. By increasing or decreasing the thresholding level, it is apparent that the liver tissue cell nuclei "Z" are readily identifiable and separable from the background artifacts in the drawing. Once the operator is satisfied that the maximum contrast has been established between the objects of interest and the background artifacts, program execution continues to step 56.

At step 56, the operator invokes the NIH Image "Analyze Particles" routine and in response thereto, the NIH Image software identifies all the regions of interest or desired objects, outlines each region with a solid black outline and converts all of the data defining pixel color/brightness within the black outline to a predetermined value. Typically, a data byte in the digital data defining the video image corresponds to an individual pixel in the image. Thus, if the image is composed of a 100×100 pixel image, a total of 10,000 data bytes are required to define the entire image. Such one to one correspondence between data bytes and individual pixels of a video monitor is a common approach known to those skilled in the art. Step 56 is shown in more detail in FIG. 3.

Figure 7:
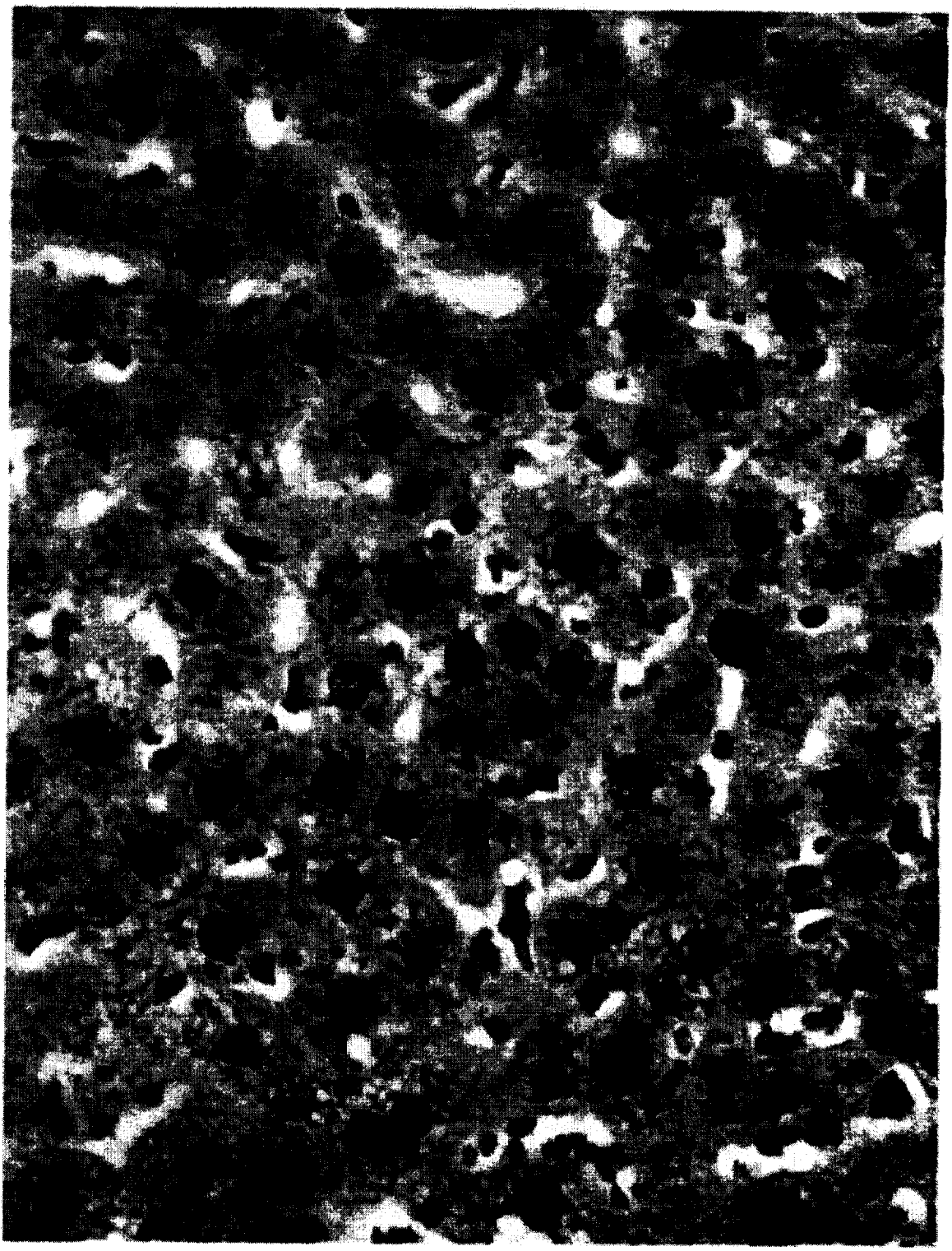
FIG. 7 is a printout of a digitized video image after the "analyze particles" routine has executed.
Figure 8:
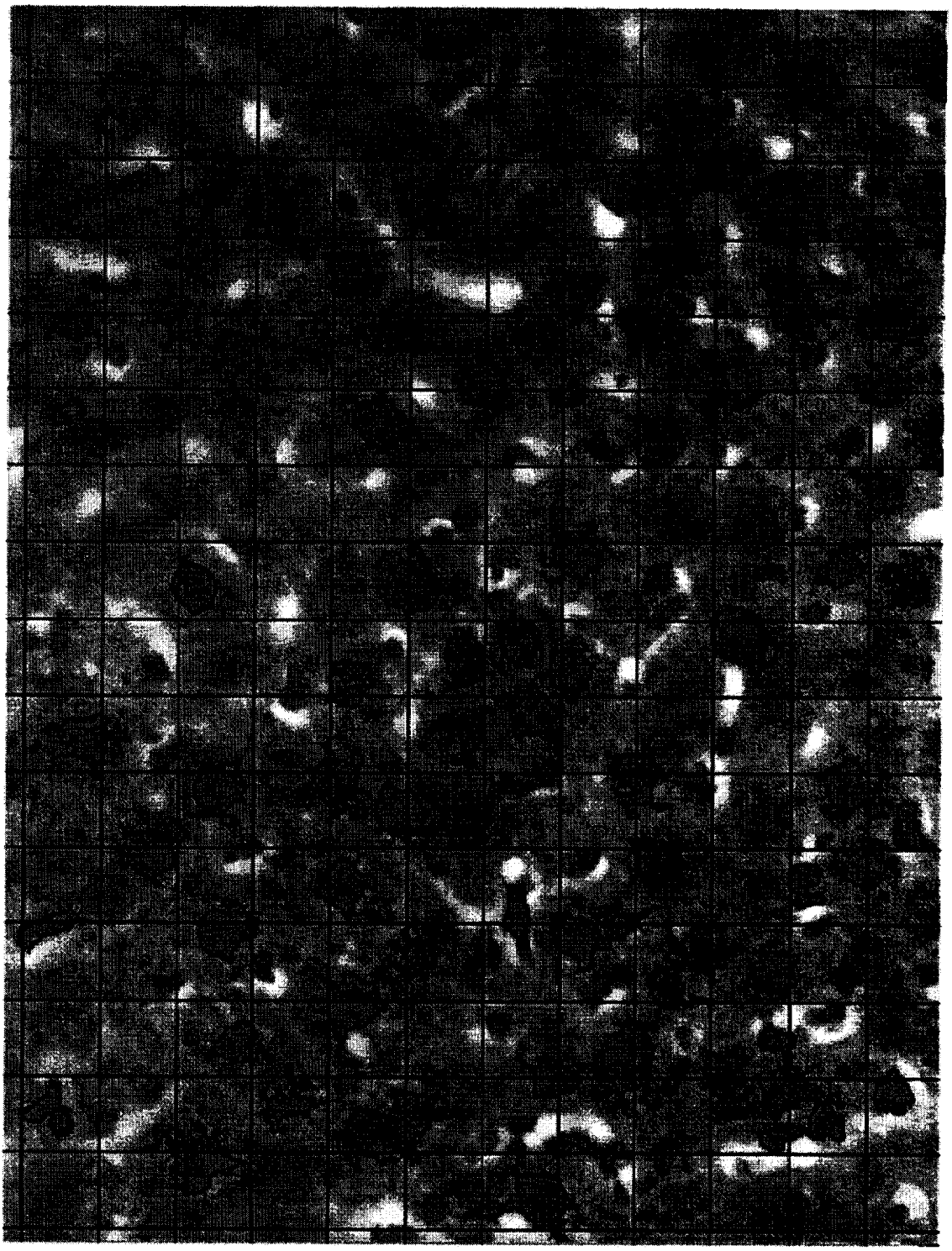
FIG. 8 is a printout of a digitized video image of the tissue sample with a stereologic grid superimposed thereon and wherein regions of interest lying beneath intersections of the grid are indicated by the character "X".

Following step 56, the operator of the apparatus 10 will invoke the "automated point counting" macro of step 58 and the computer digitally overlays a stereologic grid on the video image and identifies corresponding grid line locations in the digital data corresponding to the video image of FIG. 7. The grid is shown in FIG. 8 as overlaid on the image of FIG. 7. Additionally, intersection locations, i.e. points of intersection of the grid which lie on a region of interest or desired object are indicated by the letter "X". During the execution of step 58, all of the locations labeled "X" in FIG. 8 are located and counted by the computer 18 and such information is used in determining quantitative values via stereology techniques. Subsequently, at step 60, the number of "hits" determined in step 58 is stored for later evaluation of the quantitative data.

Three-dimensional stereologic values are then calculated or derived in step 62 using the information or data obtained from the operator or from analysis of the digitized image in steps 50–60. Stereologic values such as Number of objects per Area evaluated ($N_A$), Number of objects per Volume ($N_V$) and Volume of objects per Volume evaluated ($V_V$) are ascertainable through stereologic techniques. Additional detail regarding the calculation of these value is set forth hereinafter.

Figure 3:
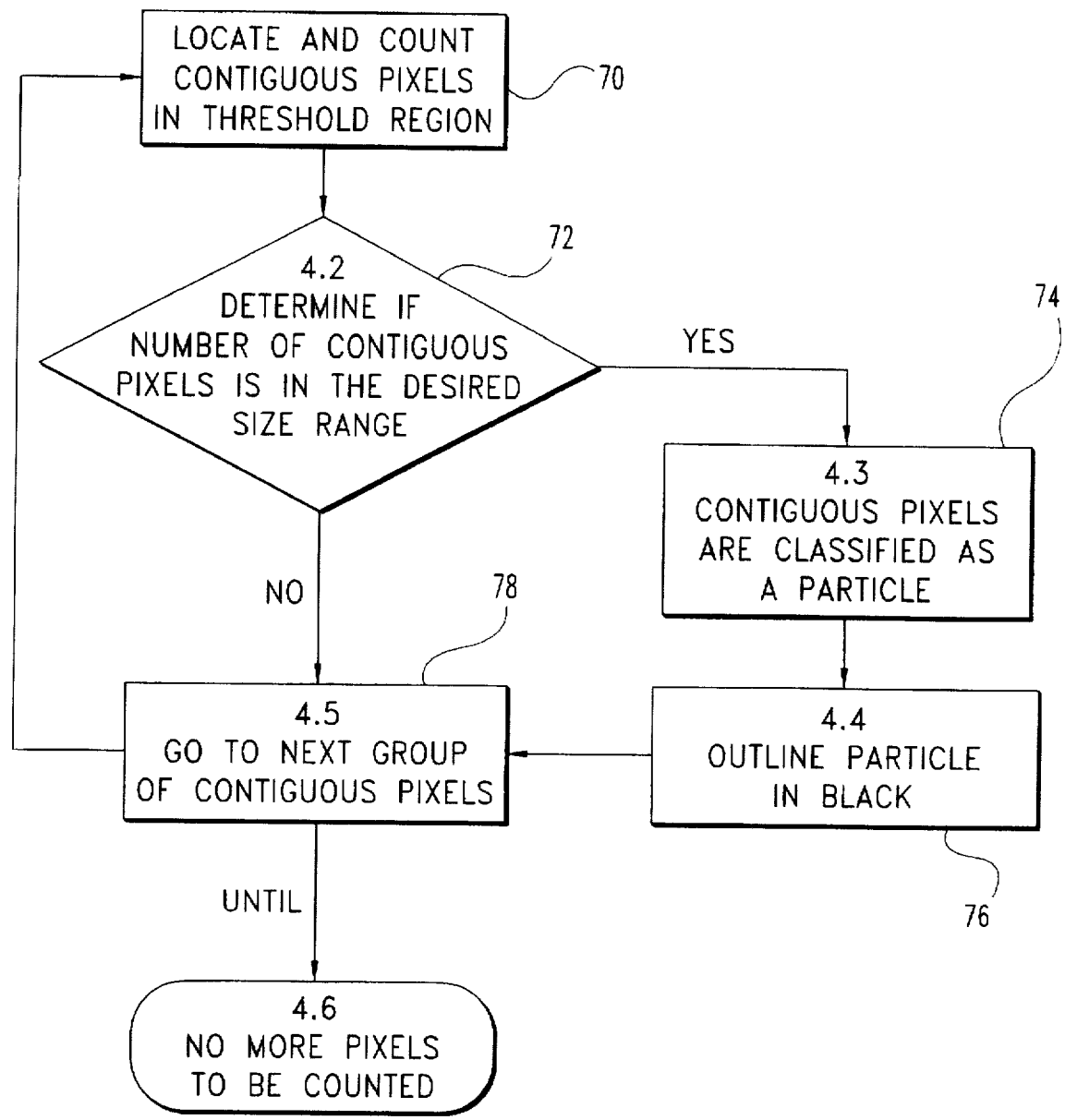
FIG. 3 is a flowchart of the NIH Image "Analyze Particles" software routine of FIG. 2.

Referring now to FIG. 3, a more detailed flow chart of the "analyze particles" routine of step 56 is shown. At step 70, data corresponding to contiguous pixels identified in a thresholded region, as depicted by the dark areas in FIG. 6, are counted. Subsequently, at step 72, the computer 18 determines if the number of contiguous pixels is in the desired size range (as previously specified by the operator). In other words, the operator specifies the size range of the objects in the image that are regions of interest or desired objects via a manual data input. If the answer to the test of step 72 is yes, then program execution continues at step 74 wherein a portion of the digital data corresponding to the contiguous pixels is classified as a particle. Thereafter at step 76, the particle is outlined with a black line (as shown in FIG. 7). The non-interactive outlining step is performed automatically in the software by changing the digital data values corresponding to the edges of the particle to a predetermined value representing a solid black line, and such is shown in the video image of FIG. 7 displayed in accordance with the digital data. Following steps 72 and 76, program execution continues with step 78 wherein the next group of contiguous pixels is located when the software executed by computer 18 searches the digital data corresponding to the pixels of the image and locates the next group of contiguous pixels that have a particular value indicating the area was thresholded in step 54. Following step 78, program execution returns to step 70 unless all digital data has been analyzed in which case program execution returns to the calling routine.

Figure 4:
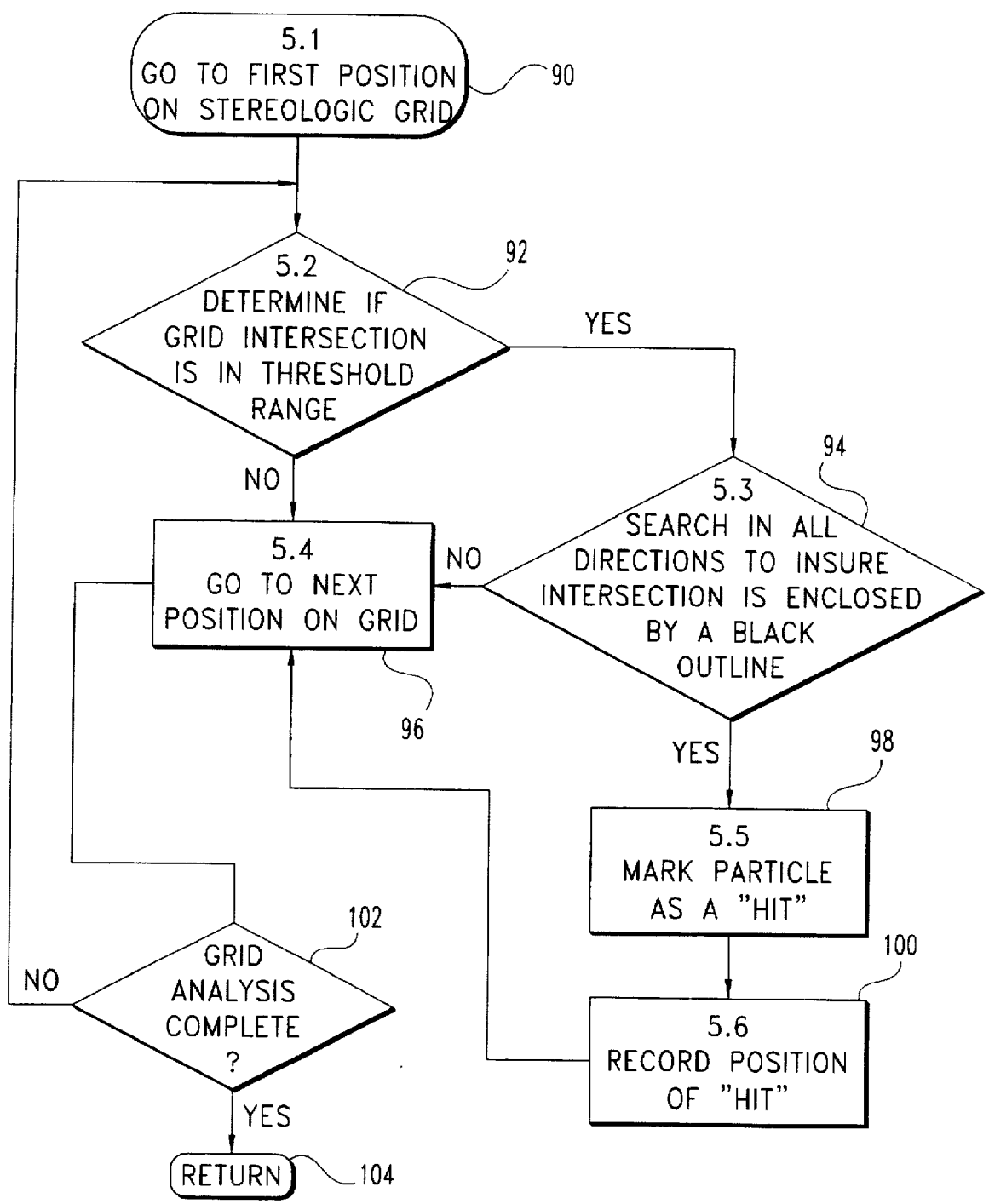
FIG. 4 is a flowchart of the "Automated Point Counting" macro software routine of FIG. 2.

Referring now to FIG. 4, a flowchart or flow diagram for the "automated point counting" macro of step 58 in FIG. 2 is shown. The more detailed flow diagram begins with step 90 wherein the software locates the digital data corresponding to a first or starting position on the digitally defined stereologic grid of FIG. 8. Subsequently, at step 92, the processor tests the digital data at that grid intersection location to see if it is within the "threshold range". If in fact the pixel is "thresholded" then program execution continues at step 94 wherein the software begins to search the digital data corresponding to the video image pixels in FIG. 7 in all directions to ensure that the intersection location is enclosed by a black outline. In other words, the processor is looking in all directions (in the digital data) for digital data corresponding to a dark pixel. If the grid intersection point is not surrounded by a solid black line at step 94, then program execution continues at step 96 wherein the analysis continues at the next position in the stereologic grid.

The pixel/data searching of step 94 is limited to a predetermined distance (or number of pixels) in a particular direction (approximately grid spacing size) since the grid size is already defined or established in comparison to the size of the regions of interest or desired objects as being large enough so that two grid intersections only rarely lie on the same region of interest or object. If at step 94 it is determined that the grid intersection location is enclosed by a solid black outline, then program execution continues at step 98 wherein the computer identifies the particle as a "hit" and increments a counter variable corresponding thereto. Thereafter at step 100, the computer 18 stores a record of the "X-Y" location or position of the "hit" for the present grid intersection location. Following step 100, program execution continues with step 96. Following step 96, step 102 is executed by the computer 18 to determine if the entire grid analysis is complete. If additional grid intersection locations have yet to be analyzed, then program execution will return to step 92. If all of the grid intersection locations have been analyzed for a thresholded value, then grid analysis and point counting is completed and program execution returns to the calling routine at step 104.

Two complimentary morphometric techniques, planimetry and point counting, are herein incorporated to evaluate pathologic changes in tissues such as liver (FIG. 5). Planimetry is used to arrive at the number of objects per area of tissue evaluated ($N_A$) while point counting is used to determine volume of objects per volume evaluated ($V_V$ or volume fraction). The number of objects per volume of tissue evaluated ($N_V$) is derived from $N_A$, $V_V$ and size and shape factor coefficients.

Figure 9:
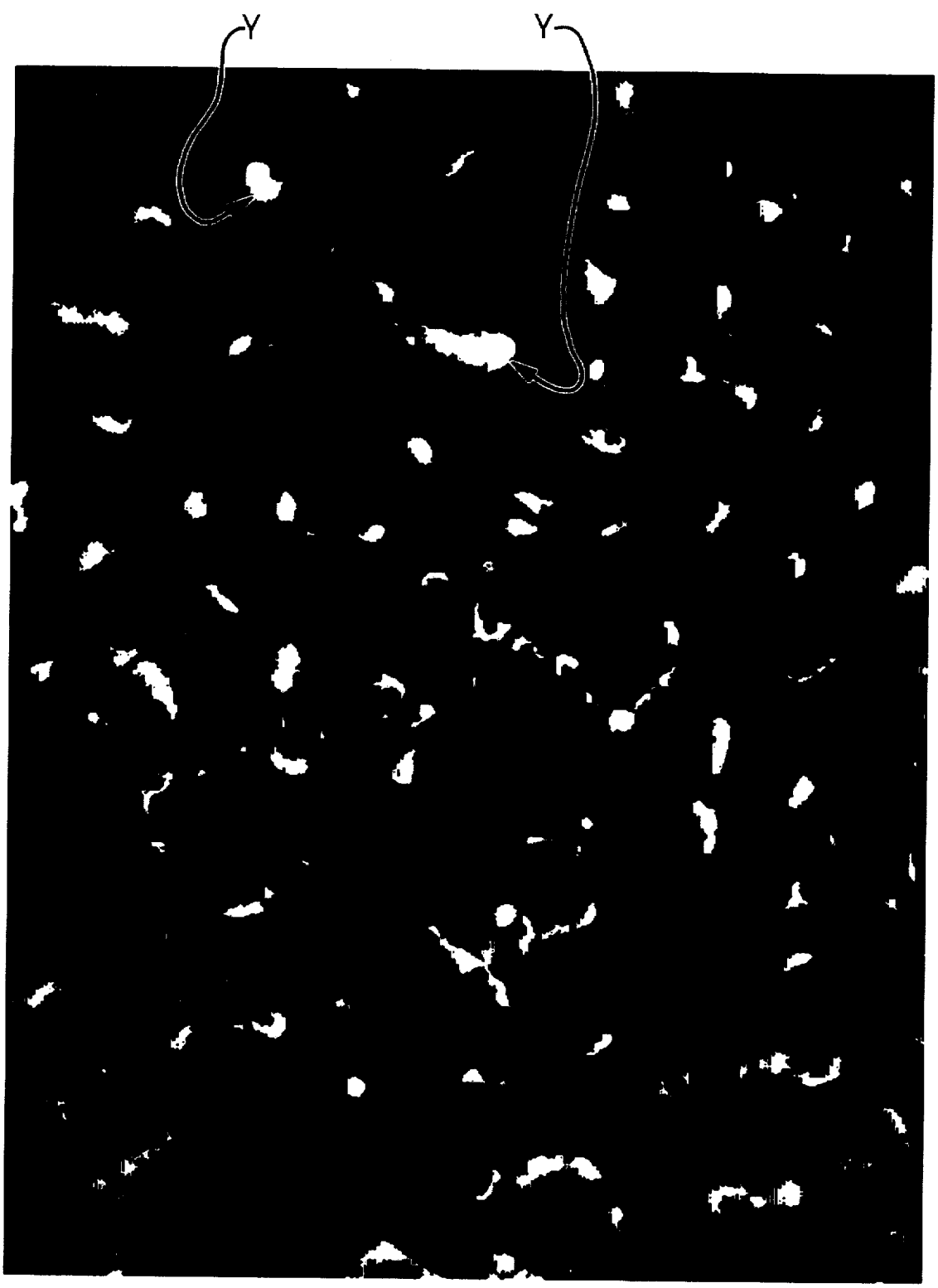
FIG. 9 is a printout of a digitized thresholded video image corresponding to FIG. 5 wherein total image area is thresholded with background articles such as holes, artifacts and lumens excluded.

The following are the equations used for determination of nuclear number per area of parenchyma ($N_A$), nuclear volume per volume of parenchyma ($V_V$), and nuclear number per volume of parenchyma ($N_V$). These equations are used in step 62 of FIG. 2. To arrive at $V_V$, it is necessary to apply the Principal of DeLesse. This very powerful stereologic tool states: $P_P$ (points per possible points)=$A_A$ (area per total area)=$V_V$ (volume per total volume).

$$N_A = \frac{\text{desired number of objects value}}{\text{parenchymal area}^*}$$

$$V_V = P_P = \frac{\text{point count value or hits}}{(\text{grid count value-background point count value "hits"})}$$

$$N_V = \frac{\kappa}{\beta} \sqrt{\frac{N_A^3}{V_V}}$$

wherein

κ=a size factor coefficient and
β=a shape factor coefficient;

*Parenchymal area is the total number of pixels contained in the video image of FIG. 9 that are dark. Pixel areas can be adjusted to metric values by a coefficient calibration factor.

Figure 10:
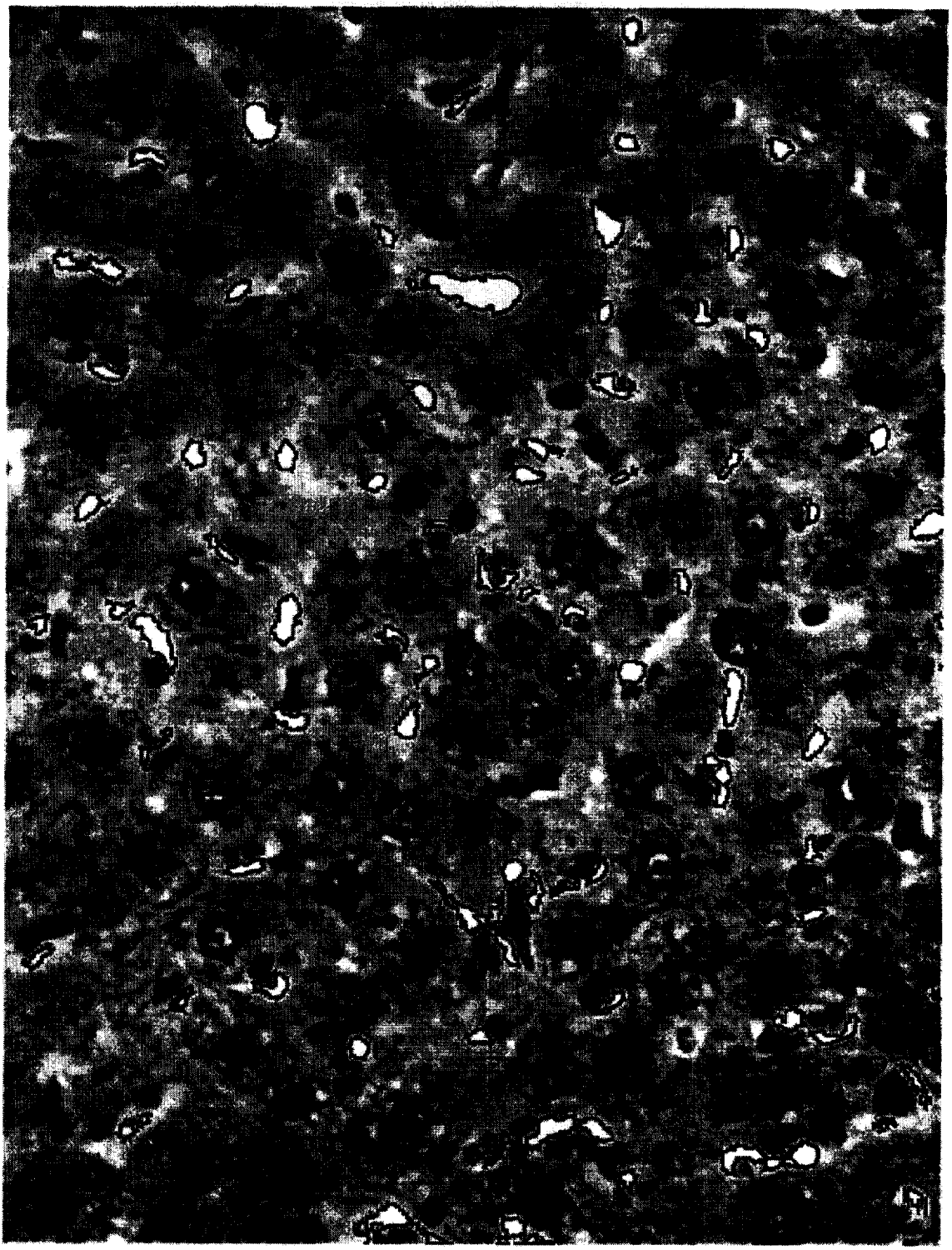
FIG. 10 is a printout of a digitized video image denoting background holes, artifacts and lumens with an "X" that fell beneath grid intersection lines when a grid is superimposed on the video image and the automated point counting routine is executed.

The desired number of objects value is obtained by electronically counting the objects outlined in step 56 (FIG. 7). The parenchymal area, excluding background, is obtained by automated counting of all tissue pixels, shown as the dark area in FIG. 9. Background is defined as the artifacts, holes and vessel lumena, which are not actually considered tissue. "Hits", or points that intersect the grid line, stored in step 60 are used as the numerator for calculating $V_V$. The background items labeled "Y" in FIG. 5 must be analyzed for points falling on intersections and then be subtracted from total possible grid count. Background is analyzed in a similar fashion through software steps shown in FIG. 2, however, the thresholding range in step 54 is altered so that only background items are thresholded. The remaining steps of FIG. 2 including the analyze particles routine of step 56, and the automated point counting macro of step 58 are executed with the thresholded objects or regions of interest appearing as white or light areas and the "hits" identified with an "X" as depicted in FIG. 10.

Further refinements of the NIH Image software will enable hue, intensity and saturation data (data produced when digitizing a color video image) to be thresholded and analyzed. Such data may reveal other noteworthy aspects in an image that are not revealed in traditional grayscale digitized video signal data.

The applications of the present invention to various stereology or morphometric applications are readily apparent. The application described herein is one of analyzing the number of liver cell nuclei versus remaining tissue in a tissue cross-section sample. However, it is recognized that applications of the device and method disclosed herein to other images is contemplated.

A computer program listing is included following the Description of the Preferred Embodiment. The program corresponds with the "automated point counting" macro, step 58, of the flow chart of FIG. 2.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

We claim:

1. A method of performing stereologic analysis of a two-dimensional image, comprising the steps of:
   producing a two-dimensional image of digital data defining a number of desired objects each having a cross-sectional area falling within a predefined area range and a number of undesired objects each having a cross-sectional area falling outside the predefined area range;
   specifying a stereologic grid size based on the predefined area range;
   converting the digital data defining each of the number of desired objects to a first pixel value;
   circumscribing each of the number of desired objects with a solid line of pixels having a second pixel value; and
   prompting an electronic data processor to automatically perform the following steps:
   (1) superimposing a stereologic grid having the specified grid size onto the two-dimensional image;
   (2) performing step (3) for every grid intersection location having corresponding digital data equal to the first pixel value; and
   (3) incrementing a point count value only if the digital data corresponding to the grid intersection location is surrounded by a solid line of pixels having the second pixel value.

2. The method of claim 1 wherein said producing step includes the steps of:
    producing a video image of a two-dimensional sample of interest; and
    digitizing the video image to produce the two-dimensional image of digital data.

3. The method of claim 1 wherein said circumscribing step includes the steps of:
    identifying all desired objects within the digital data; and
    converting the digital data corresponding to an edge of each of the number of desired objects to the second pixel value.

4. The method of claim 3 wherein said identifying step includes the steps of:
    altering the contrast of the digital data so that the number of desired objects have pixel values equal to a threshold value;
    specifying the predefined cross-sectional area range;
    analyzing contiguous pixels in each region having pixel values equal to the threshold value; and
    classifying all regions having a predefined number of contiguous pixels equal to the threshold value as desired objects.

5. The method of claim 1 wherein step (3) includes searching the digital data in an area surrounding each grid intersection location to ensure that each grid intersection location is surrounded by a solid line of pixels having the second pixel value.

6. The method of claim 1 further including the steps of:
    incrementing a desired number of objects value for each circumscribed desired object;
    determining a parenchymal area as the number of pixels of the digital data located outside of each of the number of undesired objects; and
    determining a number per area $N_A$ of desired objects within the digital data according to the equation:

$$N_A = \text{(desired number of objects value)}/\text{(parenchymal area)}.$$

7. The method of claim 6 further including the steps of:
    incrementing a background point value for each of the number of undesired objects;
    incrementing a grid count value for each stereologic grid intersection location analyzed; and
    determining a volume fraction $V_V$ of desired objects within the digital data according to the equation:

$$V_V = \text{(point count value)}/\text{(grid count value} - \text{background point count value)}.$$

8. The method of claim 7 further including the step of determining a number of desired objects per volume $N_V$ within the digital data according to the equation:

$$N_V = (\kappa/\beta)\sqrt{N_A^3/V_V},$$

wherein $\kappa$=a size factor coefficient, and $\beta$=a shape factor coefficient.

9. An apparatus for performing stereologic analysis of a two-dimensional image comprising:
    means for displaying a two-dimensional image of digital data defining a number of desired objects each having a cross-sectional area within a predefined area range and a number of undesired objects each having a cross-sectional area outside of the predefined area range;
    means responsive to a first operator command for producing a stereologic grid size signal corresponding to a stereologic grid size;
    means responsive to a second operator command for converting the digital data corresponding to each of the number of desired objects to a first pixel value;
    means responsive to a third operator command for circumscribing each of the number of desired objects with a solid line of pixels having a second pixel value;
    means responsive to a fourth operator command for automatically superimposing a stereologic grid onto the digital data according to said stereologic grid size signal;
    means responsive to said fourth operator command for automatically determining stereologic grid intersection locations having corresponding digital data equal to the first pixel value;
    means responsive to said fourth operator command for automatically determining whether a solid line of pixels having the second pixel value circumscribe each of said grid intersection locations; and
    means responsive to said fourth operator command for automatically incrementing a point count value for each of said grid intersection locations circumscribed by a solid line of pixels having the second pixel value.

10. The apparatus of claim 9 wherein said means for producing includes:
    means for producing a video image of a two-dimensional sample of interest; and
    means for digitizing the video image to produce the two-dimensional image of digital data.

11. The apparatus of claim 9 wherein said means for circumscribing includes:
    means for identifying all desired objects within the digital data; and
    means for converting the digital data corresponding to an edge of each of the number of desired objects to the second pixel value.

12. The apparatus of claim 11 wherein said means for identifying includes:
    means for altering the contrast of the digital data so that the number of desired objects have pixel values equal to a threshold value;
    means for specifying the predefined cross-sectional area range;
    means for analyzing contiguous pixels in each region having pixel values equal to the threshold value; and
    means for classifying all regions having a predefined number of contiguous pixels equal to the threshold value as desired objects.

13. The apparatus of claim 9 wherein said means for incrementing a point count value includes means for searching the digital data in an area surrounding each of said grid intersection locations to ensure that each of said grid intersection locations is circumscribed by a solid line of pixels having the second pixel value.

14. The apparatus of claim 9 further including:
    means for incrementing a desired number of objects value for each circumscribed desired object;
    means for determining a parenchymal area as the number of pixels of the digital data located outside of each of the number of undesired objects; and
    means for determining a number per area $N_A$ of desired objects within the digital data according to the equation:

$N_A$=(desired number of objects value)/(parenchymal area).

15. The apparatus of claim 14 further including:

means for incrementing a background point value for each of the number of undesired objects;

means for incrementing a grid count value for each stereologic grid intersection location analyzed; and means for determining a volume fraction $V_V$ of desired objects within the digital data according to the equation:

$V_V$=(point count value)/(grid count value–background point count value).

16. The apparatus of claim 15 further including means for determining a number of desired objects per volume $N_V$ within the digital data according to the equation:

$$N_V = (\kappa/\beta)\sqrt{N_V^{3}V_v}\,,$$

wherein $\kappa$=a size factor coefficient, and $\beta$=a shape factor coefficient.

* * * * *